United States Patent
Lenherr (10) Patent No.: US 9,109,745 B2
(45) Date of Patent: Aug. 18, 2015

(54) HANGER SYSTEM FOR SUSPENDIBLE ILLUMINATED FIXTURES

(71) Applicant: Pendant Systems Manufacturing Co., Bensalem, PA (US)

(72) Inventor: Michael C. Lenherr, Bensalem, PA (US)

(73) Assignee: Pendant Systems Manufacturing Co., Bensalem, PA (US)

( * ) Notice: Subject to any disclaimer, the term of this patent is extended or adjusted under 35 U.S.C. 154(b) by 0 days.

(21) Appl. No.: 14/356,731

(22) PCT Filed: Dec. 9, 2013

(86) PCT No.: PCT/US2013/073792
§ 371 (c)(1),
(2) Date: May 7, 2014

(87) PCT Pub. No.: WO2014/171978
PCT Pub. Date: Oct. 23, 2014

(65) Prior Publication Data
US 2015/0176761 A1    Jun. 25, 2015

Related U.S. Application Data

(63) Continuation-in-part of application No. PCT/US2013/068727, filed on Nov. 6, 2013.

(60) Provisional application No. 61/811,964, filed on Apr. 15, 2013, provisional application No. 61/813,708, filed on Apr. 19, 2013.

(51) Int. Cl.
*B42F 13/00* (2006.01)
*F16M 13/02* (2006.01)
*F21S 8/04* (2006.01)

(52) U.S. Cl.
CPC ........... *F16M 13/022* (2013.01); *F16M 13/027* (2013.01); *F21S 8/043* (2013.01)

(58) Field of Classification Search
CPC ...... F16M 13/022; F16M 13/027; F21S 8/043
USPC ................. 248/317, 318, 328, 342, 343, 344; 362/403, 407
See application file for complete search history.

(56) References Cited

U.S. PATENT DOCUMENTS

| | | |
|---|---|---|
| 1,731,942 A | 9/1926 | Simmons |
| 2,545,124 A | 3/1951 | Tornblom |

(Continued)

FOREIGN PATENT DOCUMENTS

| | | |
|---|---|---|
| FR | 2647139 A1 | 11/1990 |
| JP | 3082833 U | 10/2001 |

(Continued)

*Primary Examiner* — Gwendolyn W Baxter
(74) *Attorney, Agent, or Firm* — Michael Crilly, Esquire (57) ABSTRACT

A hanger system capable of securing an illuminated fixture to a load bearing element is presented. The hanger system includes a cap, a base, a gripper, and at least two cables. The cap includes a top wall with a first hole and a first side wall with at least one ridge. The base includes a bottom wall and a second side wall. A sleeve extends from the bottom wall toward the top wall and is aligned with the first hole. At least two channels extend from the bottom wall and contact the second side wall. A slot is disposed along the contact between each channel and the second side wall. The slot at least partially traverses the bottom wall within each channel. The base is slidably disposed within the cap with the ridges slidably engaged along the slots. The gripper secures the cap to the base via a lower stem and is removably attachable to an upper cable via an upper stem. The lower cables are removably attachable at one end to the illuminated fixture and at another end to the channels.

22 Claims, 8 Drawing Sheets

(56) References Cited

U.S. PATENT DOCUMENTS

| | | |
|---|---|---|
| 2,739,780 A | 3/1956 | Richards |
| 3,506,232 A | 4/1970 | Wolar et al. |
| 4,358,817 A | 11/1982 | Bielmeier |
| 6,517,222 B1 | 2/2003 | Orlov |
| 6,945,676 B1 | 9/2005 | Scott |
| 7,287,883 B1 | 10/2007 | Plunk et al. |
| 8,097,804 B1 | 1/2012 | Briski et al. |
| 2003/0137835 A1 | 7/2003 | Mier-Langer et al. |
| 2007/0147053 A1 | 6/2007 | Gagne et al. |
| 2013/0153731 A1 | 6/2013 | Engstrom et al. |

FOREIGN PATENT DOCUMENTS

| | | |
|---|---|---|
| JP | 2008-071604 A | 3/2008 |
| KR | 20-0377596 Y1 | 3/2005 |
| KR | 10-2011-0131999 A | 12/2011 |
| KR | 10-1221654 B1 | 1/2013 |

HANGER SYSTEM FOR SUSPENDIBLE ILLUMINATED FIXTURES

CROSS REFERENCE TO RELATED APPLICATIONS

This application is based upon and claims priority from Patent Cooperation Treaty Application No. PCT/US2013/073792 filed Dec. 9, 2013 entitled Hanger System for Suspendible Illuminated Fixtures which further claims priority from U.S. Provisional Application No. 61/813,708 filed Apr. 19, 2013 entitled Hanger System for Illuminated Fixtures and U.S. Provisional Application No. 61/811,964 filed Apr. 15, 2013 entitled Hanger System for Illuminated Fixtures. This application is also a continuation-in-part of and claims priority from Patent Cooperation Treaty Application No. PCT/US2013/068727 filed Nov. 6, 2013 entitled Hanger System for Suspendible Illuminated Fixtures which further claims priority from U.S. Provisional Application No. 61/813,708 filed Apr. 19, 2013 entitled Hanger System for Illuminated Fixtures and U.S. Provisional Application No. 61/811,964 filed Apr. 15, 2013 entitled Hanger System for Illuminated Fixtures. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a hanger for use with illuminated fixtures and more particularly is concerned, for example, with a hanger system facilitating attachment of an illuminated fixture to a load bearing element whereby a fixture is secured in a suspended fashion.

2. Background

A variety of hanger systems are presently available facilitating suspension of an illuminated fixture from a substantially horizontal load bearing element.

Presently known hanger systems are problematic for a variety of reasons. Some systems are complex and include numerous parts. Other systems require great skill in order to adequately secure, balance, and level a suspended illuminated fixture. Yet other systems are less than compatible with next generation lighting systems. As such, presently known hangers provide solutions which are labor intensive, expensive, and difficult to implement.

Presently known hanger systems also do not adequately address the aesthetics of suspended illuminated fixtures. Electrical wiring is often communicated from a ceiling or other building element to an illuminated fixture with little or no regard to appearance. This approach is acceptable when an illuminated fixture is surrounded within a drop ceiling or other means of concealment. However, present lighting trends favor free-standing, illuminated fixtures with little or no concealment features.

Accordingly, what is required is a hanger system which simplifies installation of illuminated fixtures and minimizes the unsightly appearance of electrical wiring otherwise viewable with free-standing, suspended illuminated fixtures.

SUMMARY OF THE INVENTION

An object of the invention is to provide a hanger system which simplifies installation of illuminated fixtures and minimizes the unsightly appearance of electrical wiring otherwise viewable with free-standing, suspended illuminated fixtures.

In accordance with embodiments of the invention, the hanger system includes a cap, a base, a gripper, and at least two lower cables. The cap includes a top wall and a first side wall. The first side wall is disposed about and extends from the top wall. A first hole is disposed along the top wall. The first side wall includes at least one ridge. The base includes a bottom wall and a second side wall. The second side wall is disposed about and extends from the bottom wall. A sleeve extends from the bottom wall toward the top wall. The sleeve is aligned with the first hole. At least two channels extend from the bottom wall and contact the second side wall. The second side wall and each channel have a slot where each channel contacts the second side wall. The slot at least partially traverses the bottom wall within the channel. The base is slidably disposed within the cap so that at least one ridge slidably engages at least one slot. The gripper has a first end and a second end. The gripper secures the cap to the base via the first end. The second end is removably attachable to an upper cable. The lower cables are removably attachable at one end to the suspendible illuminated fixture. The lower cables are separately secured at another end to the channels so that the lower cables extend through the slots along the base.

In accordance with other embodiments of the invention, the channels are equidistant from the sleeve.

In accordance with other embodiments of the invention, the channels are non-equidistant from the sleeve.

In accordance with other embodiments of the invention, one channel is equidistant from at least two other channels.

In accordance with other embodiments of the invention, one channel is non-equidistant from at least two other channels.

In accordance with other embodiments of the invention, the first end traverses the first hole and is removably attached to the sleeve.

In accordance with other embodiments of the invention, the first side wall partially covers the second side wall.

In accordance with other embodiments of the invention, the first side wall completely covers the second side wall.

In accordance with other embodiments of the invention, each lower cable has a first anchor which secures the lower cable to the channel.

In accordance with other embodiments of the invention, the lower cables are rotatable within the slots.

In accordance with other embodiments of the invention, the lower cables are slidable along the slots.

In accordance with other embodiments of the invention, the top wall includes a second hole and the bottom wall includes a third hole.

In accordance with other embodiments of the invention, a power cord traverses the cap and the base via the second hole and the third hole.

In accordance with other embodiments of the invention, the second hole is aligned with the third hole.

In accordance with other embodiments of the invention, the second hole and the third hole are wider than the power cord.

In accordance with other embodiments of the invention, the upper cable is removably attachable to a load bearing element.

In accordance with other embodiments of the invention, the upper cable is removably attachable to a load bearing element via a canopy assembly.

In accordance with other embodiments of the invention, the canopy assembly includes a base plate and a cover plate. The base plate is attachable to the load bearing element. The cover plate is removably attachable to the base plate. A connector is attached to the base plate. The upper cable is attached to the connector via a coupler. The power cord passes through the base plate and the cover plate adjacent to the upper cable.

In accordance with other embodiments of the invention, each lower cable includes a second anchor. A paddle is slidably disposed along each lower cable between the first anchor and the second anchor.

In accordance with other embodiments of the invention, the paddle traverses an opening along the suspendible illuminated fixture thereby securing the lower cable to the suspendible illuminated fixture. The lower cable extends from the suspendible illuminated fixture.

In accordance with other embodiments of the invention, the suspendible illuminated fixture provides illumination.

In accordance with other embodiments of the invention, the suspendible illuminated fixture displays a message.

Several advantages are offered by the invention. The invention minimizes labor and costs associated with installation of an illuminated fixture. The invention simplifies balance of illuminated fixtures which are otherwise unbalanced due to design or manufacture. The invention facilitates secured attachment of electrical wiring thereby improving the aesthetics above an illuminated fixture. The invention minimizes the adverse effects to an illuminated fixture caused by air flow. The invention is adaptable to a variety of illuminated fixtures and mounting configurations therefore.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described herein, it is understood that such features may be combinable to form other additional embodiments.

Figure 1:
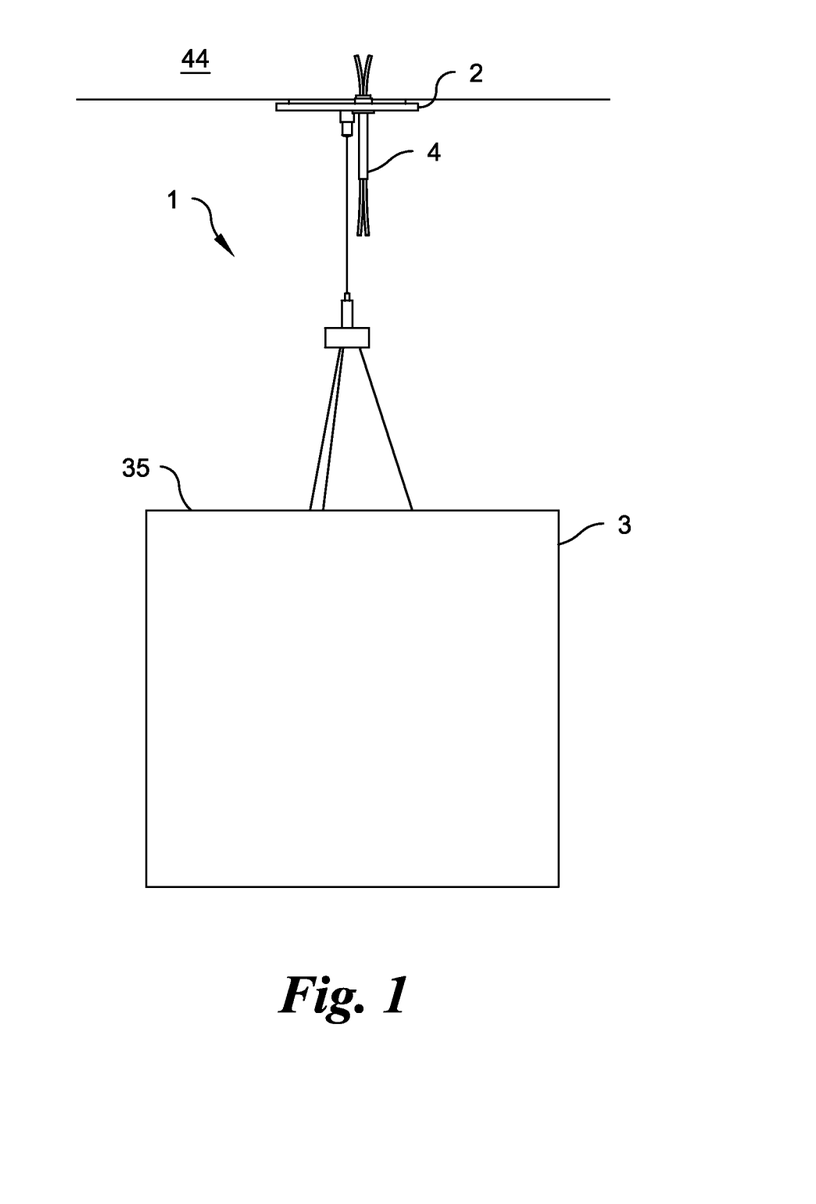
FIG. 1 is side elevation view illustrating a hanger system interposed between a canopy assembly and an illuminated fixture in accordance with an embodiment of the invention.

Referring now to FIG. 1, a hanger system 1 is shown disposed between a canopy assembly 2 and an illuminated fixture 3. An upper end of the hanger system 1 could be secured to the canopy assembly 2. The canopy assembly 2 could be further secured to a load bearing element 44, examples of the latter including, but not limited to, a junction box, a ceiling, or a beam. A lower end of the hanger system 1 could be secured to a top wall 35 along the illuminated fixture 3. A power cord 4 could pass through the canopy assembly 2, traverse the hanger system 1, and electrically terminate at the illuminated fixture 3. The illuminated fixture 3 could be a device applicable to lighting and/or messaging examples including, but not limited to, light fixtures and signage.

Figure 2:
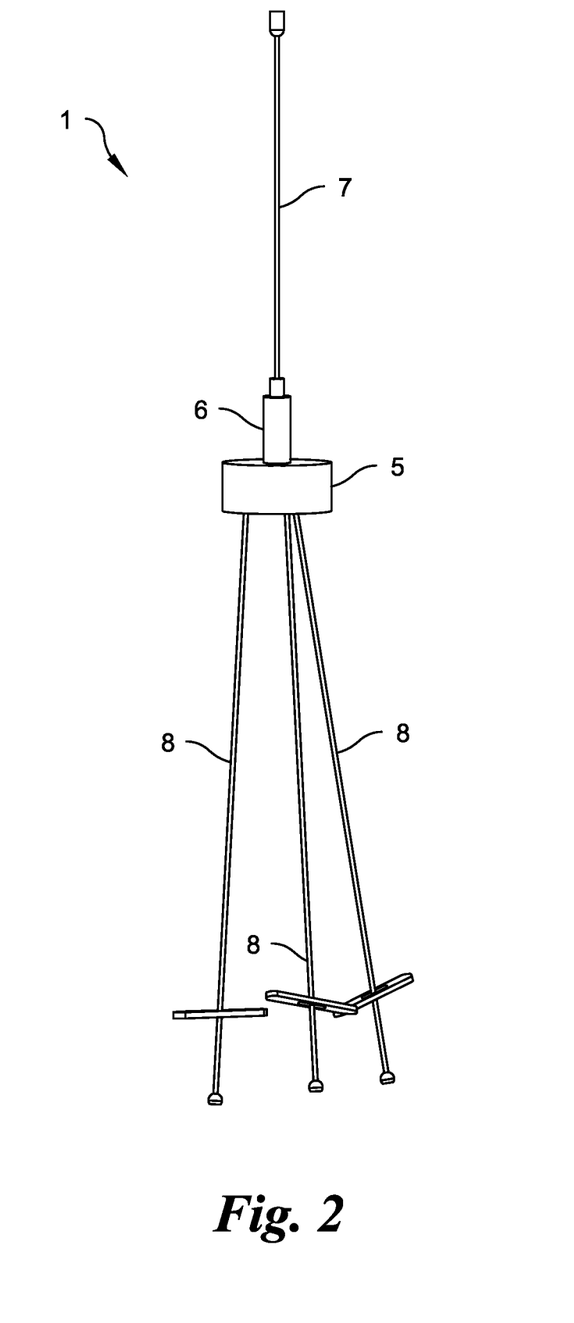
FIG. 2 is an enlarged side view illustrating a hanger system in accordance with an embodiment of the invention.

Referring now to FIG. 2, the hanger system 1 is shown including a puck 5 disposed between an upper cable 7 and several lower cables 8. The upper cable 7 and lower cables 8 are metal and/or non-metal components understood in the art capable of supporting an illuminated fixture 3 in a suspended arrangement. In preferred embodiments, each upper cable 7 and lower cable 8 could separately support a weight greater than five pounds. Although three lower cables 8 are shown in FIG. 2, it is understood that the hanger system 1 could include two or more lower cables 8. A gripper 6 could be interposed between and attached to the upper cable 7 and puck 5. The upper cable 7 could be attached to a load bearing element 44 at the end opposite of the gripper 6. The lower cables 8 could be directly attached to the puck 5.

Figure 3:
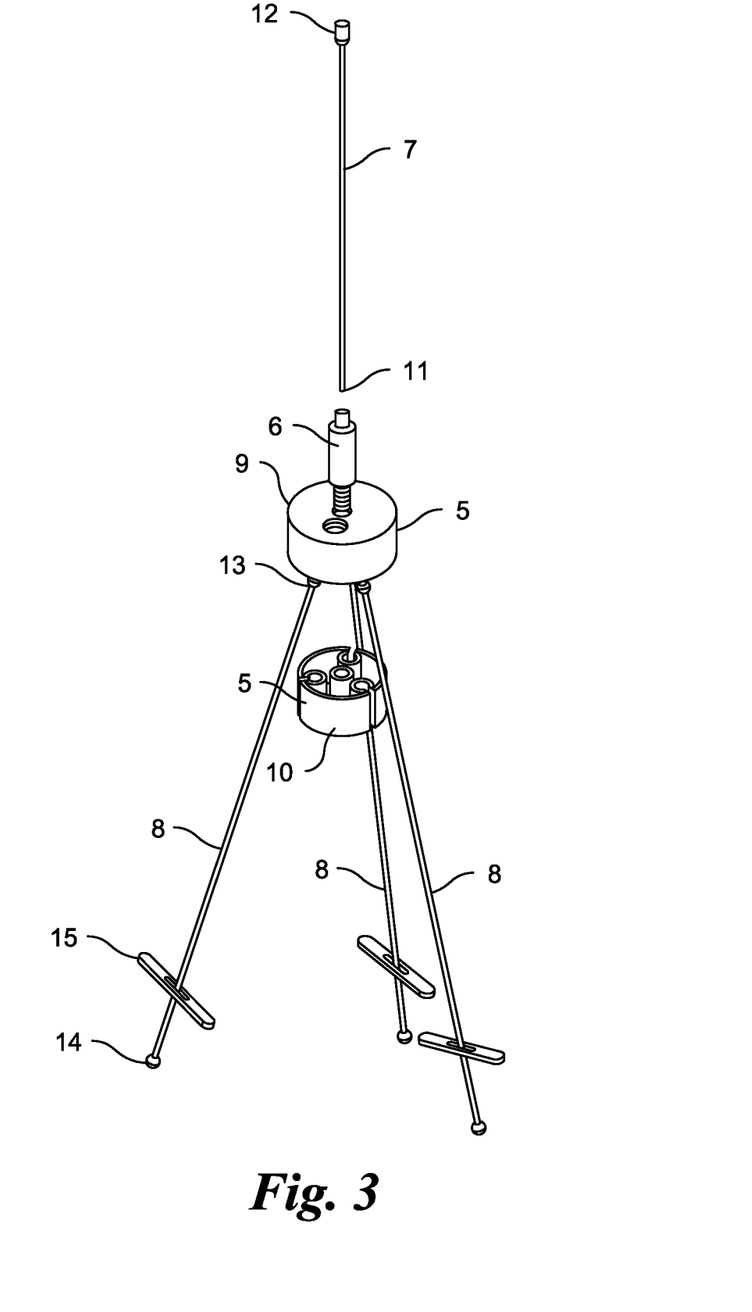
FIG. 3 is an exploded perspective view illustrating a hanger system in accordance with an embodiment of the invention.

Referring now to FIG. 3, the puck 5 is shown including a cap 9 and a base 10. The cap 9 and base 10 are manufactured via methods understood in the art. In one example, the cap 9 and base 10 could be separately machined from material blanks to include the exterior and interior features described herein. In another example, the cap 9 and base 10 could be separately molded to include the desired features.

The cap 9 and base 10 could be secured to a gripper 6 via mechanical means. For example, the gripper 6 could include threads or other mechanical features which contact the base 10, thereby securing the puck 5 to the gripper 6. The upper cable 7 includes a first end 11 and a second end 12. The first end 11 could be attached to one end of the gripper 6. Attachment could be via means understood in the art. Each lower cable 8 could include a first end 13 and a second end 14. The first ends 13 could be mechanically secured to the base 10. The second ends 14 could be mechanically fastened to an illuminated fixture 3. An optional paddle 15 could be slidably disposed along one or more lower cables 8.

Figure 4:
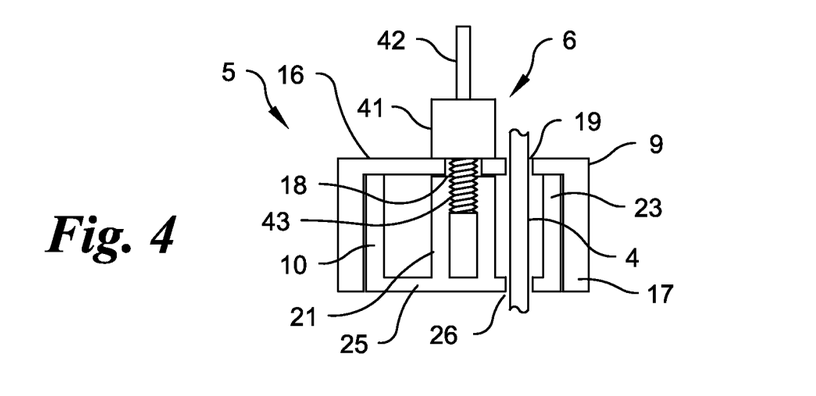
FIG. 4 is an enlarged cross section view illustrating a puck comprised of a cap and a base whereby a gripper is attached at one end of the puck and a power cord passes through the puck via a pair of holes in accordance with an embodiment of the invention.

Referring now to FIG. 4, the cap 9 and base 10 are represented as cup-shaped structures. The base 10 is dimensionally smaller than the cap 9 so as to allow insertion of the base 10 into the cap 9 and slidable engagement therebetween. The cap 9 is generally oriented downward and the base 10 is generally oriented upward so as to form a cavity when joined. In preferred embodiments, dimensions and tolerances should allow the base 10 to freely slide into and out of the cap 9. Although the cap 9 and base 10 forming the puck 5 are generally represented as circular-shaped elements, it is understood that other shapes are possible.

Figure 5A:
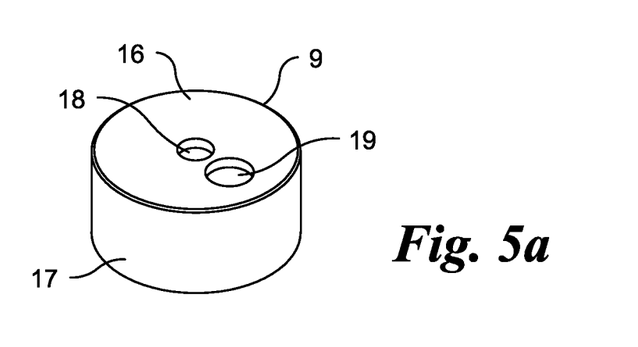
FIG. 5a is a top perspective view illustrating exterior features of a cap in accordance with an embodiment of the invention.

Referring now to FIG. 5a, the cap 9 is shown including a top wall 16 and a side wall 17. One end of the side wall 17 could be disposed about the perimeter of the top wall 16. The side wall 17 could be fixed to the top wall 16 extending therefrom in a substantially perpendicular arrangement. A hole 18 is provided along the top wall 16. In some embodiments, an optional second hole 19 could be disposed along the top wall 16. Each hole 18, 19 completely traverses the thickness of the top wall 16. The location of the holes 18 19 is design dependent based on considerations such as the design features of the cap 9 and base 10, mass characteristics of the puck 5, and properties of the illuminated fixture 3. In preferred embodiments, the hole 18 could be substantially aligned along the center of the top wall 16 and the hole 19 interposed between the first hole 18 and the side wall 17.

Figure 5B:
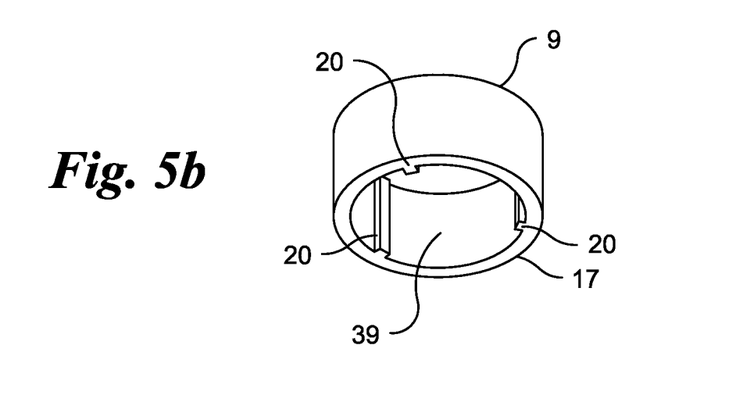
FIG. 5b is a bottom perspective view illustrating interior features of a cap in accordance with an embodiment of the invention.

Referring now to FIG. 5b, the cap 9 is shown including a ridge 20 along the interior surface 39 of the side wall 17. The ridge 20 extends from and above the interior surface 39 into the cavity within the cap 9. The ridge 20 could be aligned vertically along the side wall 17 so as to either partially or completely traverse the interior height of the side wall 17. At least one ridge 20 could be provided within the cap 9.

Figure 6A:
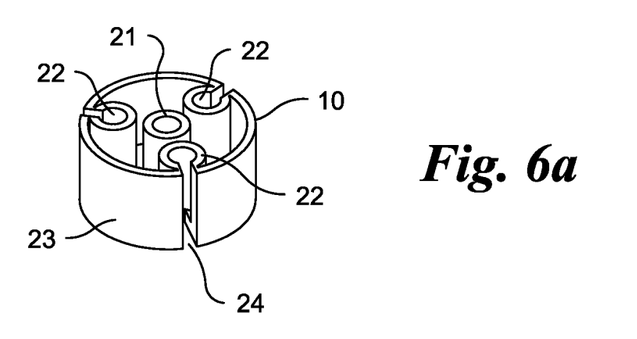
FIG. 6a is a top perspective view illustrating a base in accordance with an embodiment of the invention.
Figure 6B:
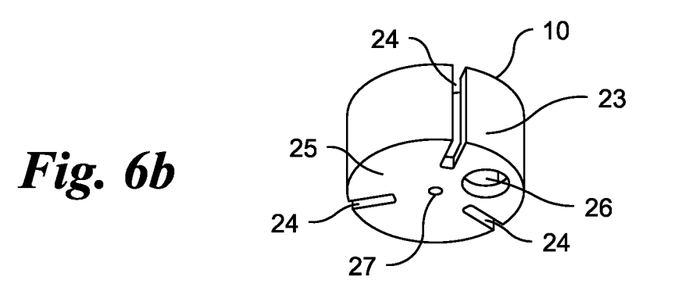
FIG. 6b is a bottom perspective view illustrating exterior features of a base in accordance with an embodiment of the invention.
Figure 6C:
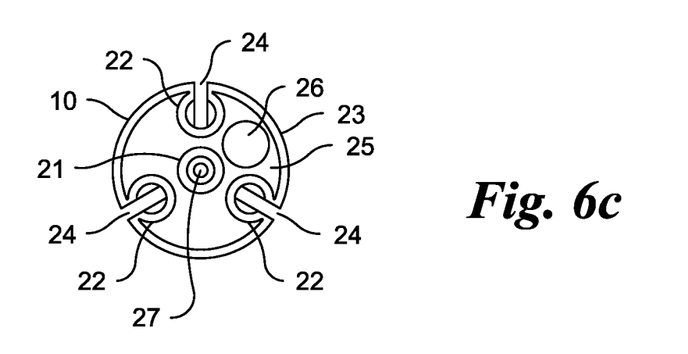
FIG. 6c is a top plan view illustrating interior features of a base in accordance with an embodiment of the invention.

Referring now to FIGS. 6a-6c, the base 10 is shown with a side wall 23 and a bottom wall 25. The side wall 23 could be disposed about the perimeter of the bottom wall 25. The side wall 23 intersections the bottom wall 25 extending therefrom in a substantially perpendicular arrangement.

A sleeve 21 is attached to the bottom wall 25 extending therefrom in a substantially perpendicular fashion. The sleeve 21 is a tube-shaped element which partially or completely traverses the interior height of the base 10. The sleeve 21 could include threads or another mechanical fastening structure which complements fastening features along the gripper 6. In preferred embodiments, the sleeve 21 is aligned along the center of mass of the puck 5, often the geometric center.

At least two channels 22 are attached to the bottom wall 25 extending therefrom in a substantially perpendicular arrangement. Each channel 22 could separately contact and be fixed to the side wall 23. The channels 22 are tube-shaped elements which partially or completely traverse the interior height of the base 10. The channels 22 are positioned along the base 10 to properly balance loads exerted by an illuminated fixture 3 onto each of the lower cables 8. Arrangement of the channels 22 is design dependent based on considerations such as the design features of the cap 9 and base 10, mass characteristics of the puck 5, and properties of the illuminated fixture 3. In some embodiments, the channels 22 could be equidistant from the sleeve 21. In other embodiments, the channels 22 could be non-equidistant from the sleeve 21. In yet other embodiments, the angular separation between adjacent channels 22 could be approximately 360°/n, where n is the total number of channels 22. In still other embodiments, the angular separation could differ. In other embodiments, one channel 22 could be equidistant from two other channels 22. In yet other embodiments, one channel 22 could be non-equidistant from two other channels 22. Other arrangements are possible for the sleeve 21 and channels 22.

A slot 24 is provided along the intersection of the side wall 23 and the channel 22. The slot 24 could extend along the bottom wall 25 so as to at least partially traverse the opening along the channel 22. A base 10 could include two or more slots 24. The slots 24 should be at least slightly wider than the width of the ridges 20 so as to allow for sliding engagement between the slots 24 and ridges 20 when the base 10 is inserted into and removed from the cap 9. The slots 24 are positioned about the side wall 23 so as to properly alignment with and engage at least one ridge 20. While one or more ridges 20 and two or more slots 24 are possible, it is understood that at least one ridge 20 should slidably engage at least one slot 24. In preferred embodiments, an equal number of ridge 20 and slots 24 are separately disposed about the cap 9 and base 10, respectively, so that the ridges 20 separately and slidably engage the slots 24.

An optional hole 26 could be provided through the bottom wall 25. The hole 26 could be positioned so as to not interfere with the function of the sleeve 21 and channels 22. In preferred embodiments, the hole 26 could be aligned with the hole 19 along the top wall 16.

Another optional hole 27 could be provided through the bottom wall 25 within the sleeve 21. The hole 27 should be sufficient large so as to vent air from the interior of the sleeve 21 when the gripper 6 is secured to the sleeve 21.

Referring again to FIG. 4, the base 10 should slidably engage the cap 9 thereby allowing for insertion and removal of the base 10 from the cap 9 during assembly and disassembly of the puck 5. In preferred embodiments, the outer dimensions of the base 10 and inner dimensions of the cap 9 should allow for at least a clearance fit. In some embodiments, the height of the side wall 17 along the cap 9 should allow the side wall 17 to completely cover the side wall 23 along the base 10. In other embodiments, the side wall 17 could partially cover the side wall 23 thereby partially exposing the slots 24 along the side wall 23.

The gripper 6 could include a barrel section 41 disposed between a first end and a second end. The first end could generally define a lower stem 43. The second end could generally define an upper stem 42. Although the lower stem 43 is described to include a threaded section, it is understood that first end could include other mechanical means understood in the art which facilitate the removable attachment of a gripper 6 to structure along the base 10. The upper stem 42 is likewise understood to include mechanical means understood in the art that facilitate the fixed or removable attachment of an upper cable 7 to a gripper 6. Exemplary grippers 6 include, but are not limited to, devices referred to as cable grippers sold by Pendant Systems Manufacturing Co. located in Bensalem, Pa. While reference is made to specific grippers 6 herein, it is understood that a gripper 6 could be any device that facilitates assembly of the cap 9 and base 10 to form a puck 5 and attachment of the puck 5 to an upper cable 7.

The lower stem 43 could be inserted into the hole 18 along the top wall 16 so as to engage complementary threads along the inner surface of the sleeve 21. The lower stem 43 could engage the sleeve 21 so that a shoulder along the barrel section 41 contacts the top wall 16, as represented in FIG. 4. The barrel section 41 could have a diameter larger than the hole 18, thereby preventing separation between the cap 9 and the base 10.

In preferred embodiments, a second hole 19 is positioned along the top wall 6 of the cap 9 and a third hole 26 is positioned along the bottom wall 25 of the base 10. The holes 19, 26 could be sufficiently aligned to allow a power cord 4 to traverse the cap 9 and base 10, as represented in FIG. 4. This arrangement facilitates a cleaner appearance as the power cord 4 is positioned substantially vertical along the length of the hanger system 1. The holes 19, 26 are also preferred to be dimensional larger than the cross section of the power cord 4 so as to prevent binding between the power cord 4 and the holes 19, 26 thereby avoiding mechanical loads along the power cord 4 by the illuminated fixture 3.

Figure 7:
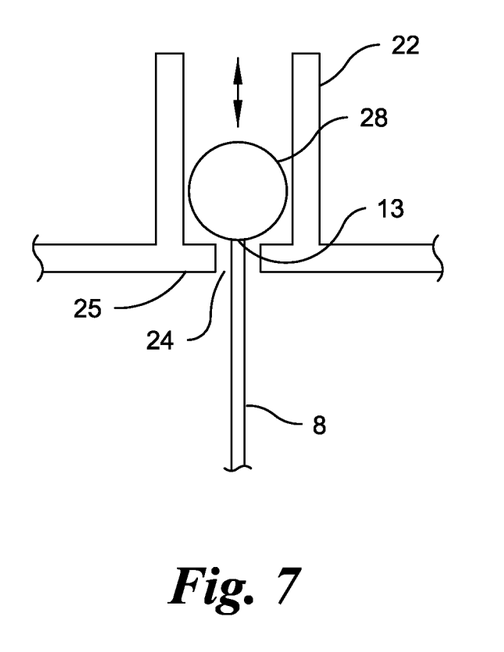
FIG. 7 is a cross section view illustrating an anchor at one end of a lower cable whereby the anchor is disposed within a channel along a base thereby securing the lower cable to a puck in accordance with an embodiment of the invention.

Referring now to FIG. 7, an anchor 28 is secured to the first end 13 of a lower cable 8. The anchor 28 could be a substantially circular element mechanically attached or molded onto the end of the lower cable 8. The anchor 28 is dimensioned so as to be insertable into, rotatable within, and freely movable along the interior of a channel 22. The anchor 28 should be wider than the width of a slot 24 so as to prevent separation from a channel 22 during use.

The slot 24 along the length of the side wall 23 simplifies assembly of the anchor 28 and lower cable 8 onto the base 10 before assembly of the puck 5. The anchor 28 is placed into the channel 22 and the lower cable 8 pulled along the slot 24 toward the bottom wall 25. It is preferred that the lower cables 8 be rotatable within and/or slidable along the slots 24. The lower cable 8 could extend through the slot 24 along the bottom wall 25 when the side wall 17 completely overlays the side wall 23. The lower cable 8 could extend through the slot 24 along the bottom wall 25 and side wall 23 when the side wall 17 partially overlays the side wall 23.

Figure 8:
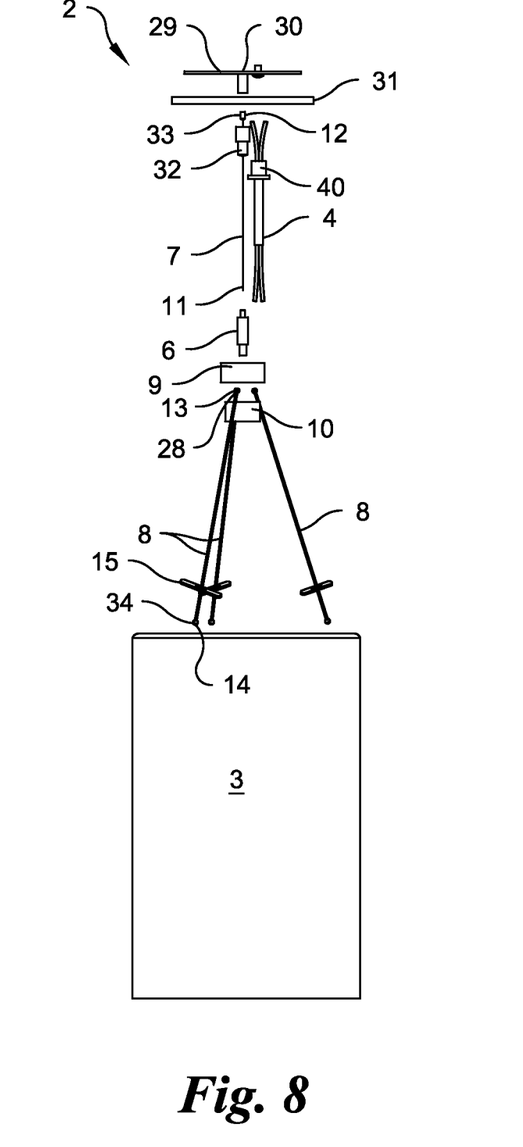
FIG. 8 is an exploded side elevation view illustrating a hanger system disposed between a suspendible illuminated fixture and a canopy assembly in accordance with an embodiment of the invention.

Referring now to FIG. 8, the canopy assembly 2 is shown including a base plate 29 and a cover plate 31. The base plate 29 could be a planar or non-planar element with holes facilitating attachment to a load bearing surface. The cover plate 31 is generally decorative and is removably attached to the base plate 29. The base plate 29 could include a connector 30 which extends from the base plate 29 away from the mounting surface. The cover plate 31 is placed onto the base plate 29 after the base plate 29 is secured to a surface. An anchor 33, similar to the anchor 28 described herein, could be attached at the second end 12 of the upper cable 7. The anchor 33 could engage a coupler 32 slidably disposed along the upper cable 7. The coupler 32 could mechanically engage the connector 30 thereby securing the upper cable 7 to the canopy assembly 2. Connector 30 and coupler 32 are components understood in the art.

The first end 11 of the upper cable 7 is removably or fixedly attached to one end the gripper 6. For example, the gripper 6 could include a spring actuated mechanism that grasps the upper cable 7. The gripper 6 is also mechanically secured to the puck 5. In some embodiments, the gripper 6 could screw into the sleeve 21 within the base 10. The cap 9 is preferred to be interposed between the base 10 and gripper 6 so to secure the cap 9 to both the gripper 6 and base 10. A first end 13 of each lower cable 8 is secured to the base 10 as otherwise described herein. The second end 14 of each lower cable 8 is secured to the illuminated fixture 3.

A power cord 4 could pass through mutually aligned openings along the base plate 29 and cover plate 31 and extend from the mounting structure. A strain relief 40 or other element known within the art could secure the power cord 4 to the canopy assembly 2. The power cord 4 could extend downward and adjacent to the upper cable 7. The power cord 4 could enter the cap 9 via the hole 19 and exits the base 10 via the hole 26, as represented in FIG. 4. In preferred embodiments, the holes 19, 26 are aligned so that the power cord 4 traverses the puck 5 without bending. The holes 19, 26 further align the power cord 4 with the hanger system 1 to provide a more aesthetically pleasing appearance. The power cord 4 then traverses the distance between the base 10 and the illuminate fixture 3. The power cord 4 could then be electrically connected to the illuminated fixture 3.

Figure 9:
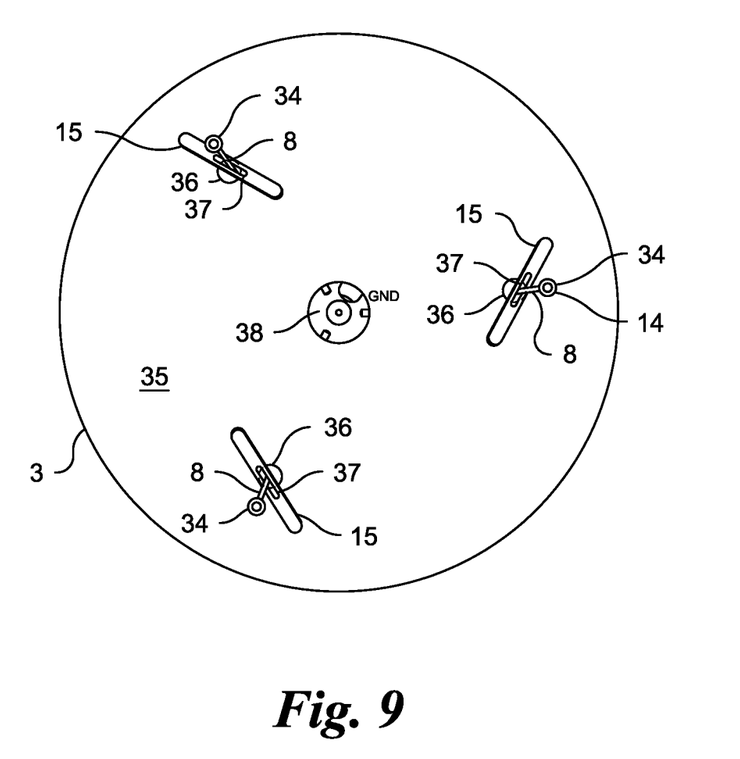
FIG. 9 is a plan view illustrating the interior surface of a top wall of a suspendible illuminated fixture wherein lower cables are attached to the fixture about a socket in accordance with an embodiment of the invention.

Referring now to FIG. 9, the second end 14 of the lower cables 8 are shown secured to the top wall 35 of an illuminated fixture 3. The lower cable 8 passes through an opening or hole 36 along the top wall 35 of an illuminated fixture 3 and a slot 37 along a paddle 15. The second end 14 of the lower cable 8 includes an anchor 34. The anchor 34 is dimensioned larger than the slot 37 thereby securing the paddle 15 to the lower cable 8. The hole 36 should be larger than the lower cable 8 but smaller than one dimension along the paddle 15 thus ensuring attachment of the second end 14 to the top wall 35. The lower cables 8 could be attached to the illuminated fixture 3 about one or more light sockets 38 and positioned to properly balance loads along the lower cables 8. While specific reference is made to a method of attachment via paddles 15, other attachment methods and hardware are possible for securing the lower cables 8 to an illuminated fixture 3.

As is evident from the explanation herein, the described invention is a hanger system which facilitates attachment of a fixture in a suspended fashion. Accordingly, the described invention is expected to be used, by way of example only, in commercial, residential, industrial, and industrial settings with devices capable of projecting light.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A hanger system for a suspendible illuminated fixture comprising:
    (a) a cap including a top wall and a first side wall, said first side wall disposed about and extends from said top wall, a first hole disposed along said top wall, said first side wall including at least one ridge;
    (b) a base including a bottom wall and a second side wall, said second side wall disposed about and extends from said bottom wall, a sleeve which extends from said bottom wall toward said top wall, said sleeve aligned with said first hole, at least two channels which extend from said bottom wall and contact said second side wall, said second side wall and each said channel having a slot where each said channel contacts said second side wall, said slot at least partially traverses said bottom wall within said channel, said base slidably disposed within said cap so that at least one said ridge slidably engages at least one said slot;
    (c) a gripper including a first end and a second end, said gripper secures said cap to said base via said first end, said second end removably attachable to an upper cable; and
    (d) at least two lower cables removably attachable at one end to said suspendible illuminated fixture, said lower cables separately secured at another end to said channels so that said lower cables extend through said slots along said base.

2. The hanger system of claim 1, wherein said channels are equidistant from said sleeve.

3. The hanger system of claim 1, wherein said channels are non-equidistant from said sleeve.

4. The hanger system of claim 1, wherein one said channel is equidistant from at least two other said channels.

5. The hanger system of claim 1, wherein one said channel is non-equidistant from at least two other said channels.

6. The hanger system of claim 1, wherein said first end traverses said first hole and removably attached to said sleeve.

7. The hanger system of claim 1, wherein said first side wall partially covers said second side wall.

8. The hanger system of claim 1, wherein said first side wall completely covers said second side wall.

9. The hanger system of claim 1, wherein each said lower cable has a first anchor, said first anchor secures said lower cable to said channel.

10. The hanger system of claim 1, wherein said lower cables are rotatable within said slots.

11. The hanger system of claim 1, wherein said lower cables are slidable along said slots.

12. The hanger system of claim 1, wherein said top wall includes a second hole and said bottom wall includes a third hole.

13. The hanger system of claim 12, wherein a power cord traverses said cap and said base via said second hole and said third hole.

14. The hanger system of claim 13, wherein said second hole is aligned with said third hole.

15. The hanger system of claim 13, wherein said second hole and said third hole are wider than said power cord.

16. The hanger system of claim 1, wherein said upper cable removably attachable to a load bearing element.

17. The hanger system of claim 1, wherein said upper cable removably attachable to a load bearing element via a canopy assembly.

18. The hanger system of claim 17, wherein said canopy assembly includes a base plate and a cover plate, said base plate attachable to said load bearing element, said cover plate removably attachable to said base plate, a connector attached to said base plate, said upper cable attached to said connector via a coupler, said power cord passes through said base plate and said cover plate adjacent to said upper cable.

19. The hanger system of claim 1, wherein each said lower cable includes a second anchor, a paddle slidably disposed along each said lower cable between said first anchor and said second anchor.

20. The hanger system of claim 19, wherein said paddle traverses an opening along said suspendible illuminated fixture to secure said lower cable to said suspendible illuminated fixture, said lower cable extends from said suspendible illuminated fixture.

21. The hanger system of claim 1, wherein said suspendible illuminated fixture provides illumination.

22. The hanger system of claim 1, wherein said suspendible illuminated fixture displays a message.

* * * * *